United States Patent
You

(10) Patent No.: US 9,487,652 B2
(45) Date of Patent: Nov. 8, 2016

(54) HALOGEN-FREE RESIN COMPOSITION, AND PREPREG AND LAMINATE FOR PRINTED CIRCUITS USING SAME

(71) Applicant: SHENGYI TECHNOLOGY CO., LTD., Guangdong (CN)

(72) Inventor: Jiang You, Guangdong (CN)

(73) Assignee: Shengyi Technology Co., Ltd., Guangdong (CN)

(*) Notice: Subject to any disclaimer, the term of this patent is extended or adjusted under 35 U.S.C. 154(b) by 0 days.

(21) Appl. No.: 14/552,775

(22) Filed: Nov. 25, 2014

(65) Prior Publication Data
US 2015/0353722 A1  Dec. 10, 2015

(30) Foreign Application Priority Data
Jun. 5, 2014  (CN) .......................... 2014 1 0246746

(51) Int. Cl.
| | | |
|---|---|---|
| B32B 27/38 | (2006.01) | |
| B32B 27/04 | (2006.01) | |
| B32B 27/18 | (2006.01) | |
| B32B 27/20 | (2006.01) | |
| B32B 27/26 | (2006.01) | |
| C08L 63/04 | (2006.01) | |
| C08G 59/24 | (2006.01) | |
| C08G 59/32 | (2006.01) | |
| C08G 59/62 | (2006.01) | |
| C08K 3/36 | (2006.01) | |
| C08K 5/49 | (2006.01) | |
| C08L 39/04 | (2006.01) | |
| C08L 63/00 | (2006.01) | |

(52) U.S. Cl.
CPC ........... *C08L 39/04* (2013.01); *C08G 59/3218* (2013.01); *C08G 59/621* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 2008/0234412 A1* | 9/2008 | Yamamoto | B82Y 30/00 524/86 |
| 2011/0089549 A1* | 4/2011 | Zenbutsu | H01L 21/565 257/676 |
| 2011/0144272 A1 | 6/2011 | Shirrell | |
| 2011/0224345 A1 | 9/2011 | Tzou et al. | |
| 2013/0316155 A1* | 11/2013 | Li | C08L 63/00 428/209 |
| 2014/0004324 A1* | 1/2014 | Hsieh | C08L 71/123 428/209 |
| 2014/0023839 A1* | 1/2014 | Wang | C08L 63/00 428/209 |
| 2014/0178656 A1* | 6/2014 | Li | H05K 1/0353 428/209 |

FOREIGN PATENT DOCUMENTS

EP  2368930  9/2011

OTHER PUBLICATIONS

"Flame Retardants" by Daihachi Chemical (no date): http://www.daihachi-chem.co.jp/eng/pdf/flame_retardants.pdf.*
Extended European Search Report cited in European Application No. 14194969.3—1301 dated Oct. 7, 2015.

* cited by examiner

*Primary Examiner* — Michael J Feely
(74) *Attorney, Agent, or Firm* — Workman Nydegger

(57) ABSTRACT

Halogen-free resin composition, prepreg, and laminate for printed circuits. Based on 100 parts by weight of organic solid matter, it comprises: (A) dicyclopentadiene-type benzoxazine resin: 50-80 parts by weight; (B) dicyclopentadiene-type epoxy resin; (C) dicyclopentadiene-type novolac hardener; (D) phosphorus-containing flame retardant. The dicyclopentadiene structure in (A) decreases the dielectric constant, dielectric dissipation value, and water absorption of cured products and maintain adhesive force as the main resin; adding (B) can improve the tenacity of cured products and maintain low water absorption and excellent dielectric performances; Taking the dicyclopentadiene-type novolac as the hardener can sufficiently exert the advantage of excellent dielectric performances and good thermal and moisture resistance resulted from the dicyclopentadiene-containing structure. The prepreg above and the laminate for printed circuits using the prepreg have low dielectric constant, low dielectric dissipation factor, low water absorption, high adhesion, high thermal resistance and good flame retardancy, processability and chemical resistance.

15 Claims, No Drawings

HALOGEN-FREE RESIN COMPOSITION, AND PREPREG AND LAMINATE FOR PRINTED CIRCUITS USING SAME

TECHNICAL FIELD

The present invention relates to a halogen-free resin composition, and prepreg and laminate for printed circuits using same, which have the advantages of low dielectric constant, low dielectric dissipation factor, low water absorption, high adhesion, high thermal resistance and good flame retardancy, processability and chemical resistance.

BACKGROUND ART

Traditional laminates for printed circuits usually employ brominated flame retardants to achieve flame retardancy, and especially employ tetrabromobisphenol-A epoxy resin. Such brominated flame retardant has good flame retardancy but generates hydrogen bromide gas when being combusted. In addition, dioxin, dibenzofuran and other cancerogenic substances have been detected in combustion products of halogen (such as bromide and chloride, etc.)-containing electrical and electronic equipment wastes for the past few years, therefore the application of brominated epoxy resins is under restrictions. Two European Union environment-protecting directives of "waste electrical and electronic equipment" and "the restriction of the use of certain hazardous substances in electrical and electronic equipment" have been officially implemented on Jul. 1, 2006, and the development of halogen-free flame retardant copper-clad laminates has become a hot spot in the industry. Each copper-clad laminates manufacturer has sequentially put forwards its own halogen-free flame retardant copper-clad laminates.

Along with high speed and multi-functionalization in information processing of electronic products, application frequency has been constantly increased. Except for maintaining higher requirements for thermal resistance of laminate materials, dielectric constant and dielectric dissipation value are requested to be increasingly low. Accordingly, reducing Dk/Df has been a hot spot pursued by baseboard practitioners.

Traditional FR-4 materials generally employ dicyandiamide as hardener. Such hardener has tertiary reactive amine and possesses good process operability. However, since its carbon-nitrogen bond is relatively weak, likely to crack at high temperature, so the thermal decomposition temperature of cured products is low, which is unable to meet the thermal resistance requirement of lead-free process. Under this background, along with the large-scale implementation of lead-free process in 2006, phenolic resins started to be used as hardener for epoxy in the industry. Since phenolic resins has a benzene ring structure of a high density, the thermal resistance of the system after curing with epoxy is excellent, but meanwhile the dielectric performances of the cured products have a tendency of degradation.

SUMMARY

Aiming at the problems of the existing technology, the object of the present invention lies in providing a halogen-free low dielectric resin composition, and prepreg and laminate for printed circuits using same. The laminate for printed circuits made by the resin composition has the advantages of low dielectric constant, low dielectric dissipation factor, low water absorption, high adhesion, high thermal resistance and good flame retardancy, processability and chemical resistance, etc.

DETAILED DESCRIPTION

The present inventors conducted repeated and deep studies to achieve the aforementioned purposes. As a consequence, it is found that the resin composition prepared by properly mixing dicyclopentadiene-type benzoxazine resin, dicyclopentadiene-type epoxy resin, dicyclopentadiene-type novolac hardener, phosphorus-containing flame retardant and optional other substances, can achieve the aforementioned purposes.

That is, the present invention employs the following technical solution: a halogen-free resin composition, based on 100 parts by weight of organic solid matter in the composition, comprising the following four substances:

(A) dicyclopentadiene-type benzoxazine resin: 50-80 parts by weight;
(B) dicyclopentadiene-type epoxy resin;
(C) dicyclopentadiene-type novolac hardener
(D) phosphorus-containing flame retardant.

The present invention employs the dicyclopentadiene-type benzoxazine resin as the main resin, which contains a dicyclopentadiene structure, has excellent dielectric performances in addition to possessing traditional advantages of benzoxazine like high glass transition temperature (Tg), low water absorption, high dimensional stability, good thermal resistance and flame retardancy, and is able to decrease the dielectric constant, dielectric dissipation value and water absorption of the cured products and maintain a relatively high adhesion; Adding the dicyclopentadiene-type epoxy resin can improve the toughness of the cured products and maintain low water absorption and excellent dielectric performances; Using the dicyclopentadiene-type novolac as hardener can sufficiently exert the advantage of excellent dielectric performances and good thermal and moisture resistance resulted from the dicyclopentadiene structure.

In addition to sufficiently exerting each advantage of the three components above, through the synergistic effect among them, the present invention exert the advantages of each component to the maximum level, which allows the cured products obtained to have advantages of low dielectric constant, low dielectric dissipation factor, low water absorption, high adhesion, high thermal resistance and good flame retardancy, processability and chemical resistance.

Further, the dicyclopentadiene-type benzoxazine resin and the phosphorus-containing flame retardant have a synergistic flame retardant effect, able to reduce the phosphorus content required for the flame retardancy of the cured products to meet UL94V-0, and further decrease water absorption.

The component (A) in the present invention, i.e., the dicyclopentadiene-type benzoxazine resin can provide the electrical performances, moisture resistance, dimensional stability, thermal resistance, flame retardancy and mechanical performances required by the cured resin and the laminates prepared therefrom.

Based on 100 parts by weight of the organic solid matter, the additive amount of the component (A) dicyclopentadiene-type benzoxazine resin is 50-80 parts by weight, for example 52 parts by weight, 54 parts by weight, 56 parts by weight, 58 parts by weight, 60 parts by weight, 62 parts by weight, 64 parts by weight, 66 parts by weight, 68 parts by weight, 70 parts by weight, 72 parts by weight, 74 parts by weight, 76 parts by weight or 78 parts by weight.

The chemical structural formula of the component (A) dicyclopentadiene-type benzoxazine resin is as follows:

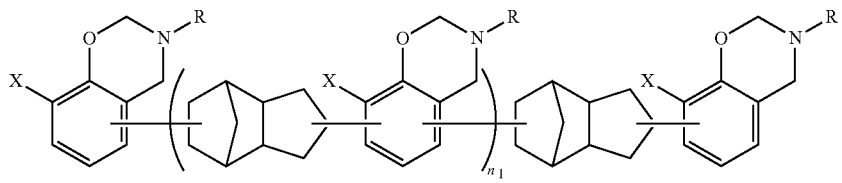

In the formula, X is selected from —H, —$CH_3$, —$C_2H_5$, —$C(CH_3)_3$, $n_1$ is 0 or 1, R is selected from an alkyl or an aryl.

The component (B) dicyclopentadiene-type epoxy resin can maintain a higher rigidity and storage modulus of the cured products while improving the dielectric performances and toughness of the cured products. Based on 100 parts by weight of the organic solid matter, the additive amount of the component (B) is 5-30 parts by weight, for example 6 parts by weight, 8 parts by weight, 10 parts by weight, 12 parts by weight, 14 parts by weight, 16 parts by weight, 18 parts by weight, 20 parts by weight, 22 parts by weight, 24 parts by weight, 26 parts by weight or 28 parts by weight.

The component (B) dicyclopentadiene-type epoxy resin in the present invention has the following chemical structural formula:

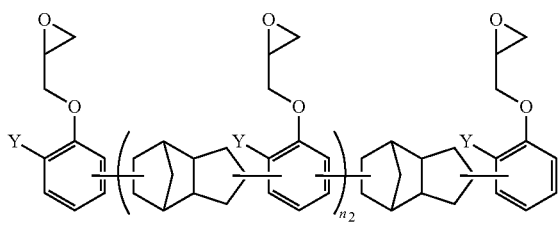

In the formula, Y is selected from —H, —$CH_3$, —$C_2H_5$, —$C(CH_3)_3$, $n_2$ is any integer in 0-7, for example 1, 2, 3, 4, 5 or 6.

The component (C) dicyclopentadiene-type novolac hardener can not only improve the dielectric performances of cured products, but also maintain a high reactive activity of the composition. Based on 100 parts by weight of the organic solid matter, the additive amount of the component (C) is 5-20 parts by weight, for example 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight or 19 parts by weight.

The component (C) dicyclopentadiene-type novolac hardener in the present invention has the following chemical structural formula:

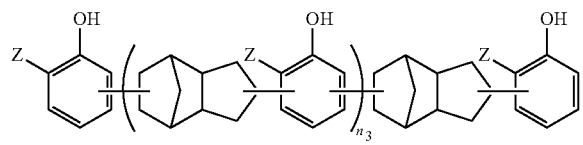

In the formula, Z is selected from —H, —$CH_3$, —$C_2H_5$, —$C(CH_3)_3$, $n_3$ is any integer in 0-7, for example 1, 2, 3, 4, 5 or 6.

The component (D) in the present invention, i.e., the phosphorus-containing flame retardant allows the resin composition to have flame retardant character, and meet the requirement of UL 94V-0. The additive amount of the flame retardant is determined according to the requirement that the flame retardancy of the cured products should reach UL 94V-0 level, without particular restriction. Based on 100 parts by weight of the total additive amounts of component (A), component (B) and component (C), the additive amount of the component (D) is 5-50 parts by weight, for example 7 parts by weight, 9 parts by weight, 11 parts by weight, 13 parts by weight, 15 parts by weight, 17 parts by weight, 19 parts by weight, 21 parts by weight, 23 parts by weight, 25 parts by weight, 27 parts by weight, 29 parts by weight, 31 parts by weight, 35 parts by weight, 37 parts by weight, 39 parts by weight, 41 parts by weight, 43 parts by weight, 45 parts by weight, 47 parts by weight or 49 parts by weight, preferably 5-30 parts by weight.

Preferably, the component (D) phosphorus-containing flame retardant is any one of tri(2,6-dimethylphenyl)phosphine, 10-(2,5-dihydroxyphenyl)-9,10-dihydro-9-oxa-10-phosphaphenanthrene-10-oxide, 2,6-bis(2,6-dimethylphenyl)phosphino benzene, 10-phenyl-9,10-dihydro-9-oxa-10-phosphaphenanthrene-10-oxide, phenoxyphosphazene compound, phosphate, polyphosphate, phosphonate or polyphosphonate, or a mixture of at least two. The mixture is for example a mixture of tri(2,6-dimethylphenyl)phosphine and 10-(2,5-dihydroxyphenyl)-9,10-dihydro-9-oxa-10-phosphaphenanthrene-10-oxide, a mixture of 2,6-bis(2,6-dimethylphenyl)phosphino benzene and 10-phenyl-9,10-dihydro-9-oxa-10-phosphaphenanthrene-10-oxide, a mixture of phenoxyphosphazene compound, phosphate and polyphosphate, or a mixture of tri(2,6-dimethylphenyl)phosphine, 10-(2,5-dihydroxyphenyl)-9,10-dihydro-9-oxa-10-phosphaphenanthrene-10-oxide, 2,6-bis(2,6-dimethylphenyl) phosphino benzene, 10-phenyl-9,10-dihydro-9-oxa-10-phosphaphenanthrene-10-oxide, phenoxyphosphazene compound, phosphate and polyphosphate.

Preferably, the resin composition in the present invention also comprises component (E) curing accelerator, curing the resin and accelerating the curing speed of the resin.

The component (E) curing accelerator is selected from imidazoles hardener or/and pyridines hardener, preferably any one of 2-methylimidazole, 2-ethyl-4-methylimidazole, 2-phenylimidazole, 2-undecylimidazole, triethylamine, benzyl dimethyl amine or dimethyl amino pyridine, or a mixture of at least two. The mixture is for example a mixture of 2-methylimidazole and 2-ethyl-4-methylimidazole, a mixture of 2-phenylimidazole and 2-undecylimidazole, a mixture of triethylamine, benzyl dimethyl amine and dimethyl amino pyridine, a mixture of 2-methylimidazole, 2-ethyl-4- methylimidazole, 2-phenylimidazole and 2-undecylimidazole, or a mixture of triethylamine, benzyl dimethyl amine, dimethyl amino pyridine and 2-methylimidazole.

The additive amount of component (E) curing accelerator is 0.05-1% of the total weight of the four, component (A) dicyclopentadiene-type benzoxazine resin, component (B) dicyclopentadiene-type epoxy resin, component (C) dicyclopentadiene-type novolac hardener and component (D) phosphorus-containing flame retardant, for example 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.8%, 0.9% or 0.95%.

Preferably, the resin composition in the present invention also comprises component (F) filler, which is primarily used to adjust some physical property effects of the composition, such as to decrease coefficient of thermal expansion (CTE), to decrease water absorption and to enhance thermal conductivity, etc.

Preferably, the component (F) filler is an inorganic filler or/and an organic filler.

Preferably, the inorganic filler may be any one selected from fused silica, crystalline silica, spherical silica, hollow silica, aluminum hydroxide, aluminum oxide, talcum powder, aluminum nitride, boron nitride, silicon carbide, barium sulfate, barium titanate, strontium titanate, calcium carbonate, calcium silicate, mica or glass fiber powder, or a mixture of at least two. The mixture is for example a mixture of fused silica and crystalline silica, a mixture of spherical silica and hollow silica, a mixture of aluminum hydroxide and aluminum oxide, a mixture of talcum powder and aluminum nitride, a mixture of boron nitride and silicon carbide, a mixture of barium sulfate and barium titanate, a mixture of strontium titanate, calcium carbonate and calcium silicate, a mixture of mica, glass fiber powder, fused silica and crystalline silica, a mixture of spherical silica, hollow silica, aluminum hydroxide and aluminum oxide, a mixture of talcum powder, aluminum nitride, boron nitride, silicon carbide, barium sulfate and barium titanate, or a mixture of strontium titanate, calcium carbonate, calcium silicate, mica and glass fiber powder.

Preferably, the organic filler may be any one selected from polytetrafluoroethylene powder, polyphenylene sulfide or polyether sulfone powder, or a mixture of at least two. The mixture is for example a mixture of polytetrafluoroethylene powder and polyphenylene sulfide, a mixture of polytetrafluoroethylene powder and polyether sulfone powder, a mixture of polyphenylene sulfide and polyether sulfone powder, or a mixture of polytetrafluoroethylene powder, polyphenylene sulfide and polyether sulfone powder.

Preferably, the most preferred filler is silica. The moderate value of the particle size of the filler is 1-15 μm, preferably the moderate value of the filler is 1-10 μm. The filler lying in such particle size range has good dispersibility.

Preferably, the additive amount of the filler occupies 0-50% of the total weight of the organic solid matter in the halogen-free resin composition and 0 excluded, preferably 0.5%, 1%, 3%, 6%, 9%, 12%, 15%, 18%, 21%, 23%, 25%, 27%, 29%, 31%, 33%, 35%, 37%, 39%, 41%, 43%, 45%, 47% or 49%.

The term "comprise" as described in the present invention intend to mean that it may comprise other components in addition to the said components, and these other components provide different characters for the halogen-free resin composition. Additionally, the term "comprise" of the present invention can also be replaced with close-ended "is" or "consist of . . . "

For example, the halogen-free resin composition may also contain various additives. As specific examples, an antioxidant, a thermal stabilizer, an antistat, an ultraviolet absorber, a pigment, a colorant or a lubricant can be listed. These various additives may be used alone, or used in combination with two or more.

The conventional method for preparing the varnish of the present invention is: firstly the solid matter is introduced in, and then the liquid solvent is added. After stirring until the solid matter is completely dissolved, then the liquid resin and curing accelerator are added and continuing stirring until homogeneously mixed. Finally the solid content is adjusted to 65%-75% with the solvent, thereby the varnish is prepared.

A prepreg, comprising a reinforcing material and the halogen-free resin composition above attached thereon after impregnation and drying.

The prepreg of the present invention is prepared by heating and drying the halogen-free resin composition above. The based material used is a nonwoven fabric or other fabrics, such as natural fibers, organic-synthetic fibers and inorganic fibers.

The varnish above is used to impregnate the reinforcing material like glass fabrics. The reinforcing material impregnated is heated and dried for 5-10 minutes in an oven at 155° C. to prepare the prepreg.

A laminate for printed circuits, which comprises at least 1 laminated prepreg above.

A metal-clad laminate for printed circuits, which comprises at least 1 laminated prepreg above, metal foils covered on one or both sides of the laminated prepregs, and can be prepared by heat and pressure molding. That is, the metal-clad laminate for printed circuits of the present invention comprises the laminate prepared by adhering one or more than one prepreg together through heating and pressing, and the metal foils adhered on one or both sides of the laminate.

An exemplary metal-clad laminate is a double-side metal-clad laminate consequently formed by using 10 prepregs above and 2 metal foils of 1 ounce (a thickness of 35 μm) overlapping together, laminating with hot press. The laminating should meet the following requirements: ① the heating rate of laminating should be controlled at 1.5~2.5° C./min when the material temperature is 80~120° C.; ② the pressure setting for laminating is that full pressure is applied at an outer-layer material temperature of 120~150° C., wherein the full pressure is about 350 psi; ③ when being cured, the material temperature is controlled at 190° C. and maintained for 90 min. The metal foil refers to copper foil, nickel foil, aluminum foil and SUS foil, without limitation to the material thereof.

Compared to the existing art, the present invention has the following beneficial effects:

① The halogen-free resin composition involved in the present invention employs dicyclopentadiene-type benzoxazine resin as the main resin. The benzoxazine resin contains a dicyclopentadiene structure, has excellent dielectric performances in addition to possessing traditional advantages of benzoxazine like high glass transition temperature (Tg), low water absorption, high dimensional stability, good thermal resistance and flame retardancy, and is able to decrease the dielectric constant, dielectric dissipation value and water absorption of cured products and maintain a relatively high adhesive force when used as the main resin; the benzoxazine resin and the phosphorus-containing flame retardant have a synergistic flame retardant effect, able to reduce the phosphorus content required for the flame retardancy of the cured products to meet UL94V-0, and further decrease water absorption; ② the halogen-free resin composition of the present invention is also added with dicyclopentadiene-type epoxy resin, able to improve the tenacity of the cured products and maintain low water absorption and excellent dielectric performances; ③ the halogen-free resin composition of the present invention takes the dicyclopentadiene-type novolac as the hardener, which can sufficiently exert the advantage of excellent dielectric performances and good thermal and moisture resistance resulted from the dicyclopentadiene-containing structure; ④ the prepreg and laminate for printed circuits using the resin composition have the advantages of low dielectric constant, low dielectric dissipation factor, low water absorption, high adhesion, high thermal resistance and good flame retardancy, processability and chemical resistance.

EXAMPLES

The technical solutions of the present invention are further described below through examples comprising examples of specific embodiments.

Aiming at the laminate for printed circuits prepared above (10 prepregs), the performances like glass transition temperature, dielectric constant, dielectric dissipation factor, peel strength, water absorption, thermal resistance, flame retardancy and the like are measured. The examples as follow will conduct a further detailed explanation and description.

Please refer to the examples 1-5 and the comparative examples 1-8.

Now the examples of the present invention are described as follows, but the present invention is not limited to the scope of the examples. Without specific description hereinafter, the "part" thereof represents "part by weight", the "%" thereof represents "wt. %"

(A) benzoxazine resin
(A-1) dicyclopentadiene-type benzoxazine resin LZ 8260N70 (trade name of HUNTSMAN)
(A-2) bisphenol-A benzoxazine resin LZ 8290H62 (trade name of HUNTSMAN)
(B) epoxy resin
(B-1) dicyclopentadiene-type epoxy resin HP-7200H (trade name of Dainippon ink)
(B-2) isocyanate-modified epoxy resin XZ-97103 (trade name of DOW, America)
(C) hardener
(C-1) dicyclopentadiene-type novolac hardener 6115L (trade name of GUN EI, Japan)
(C-2) linear novolac MOMENTIVE 2812 (trade name of MOMENTIVE, Korea)
(D) phosphorus-containing flame retardant XZ92741 (trade name of DOW, America)
(E) 2-phenylimidazole (SHIKOKU Chemicals Corporation, Japan)
(F) filler
Spherical silica micro powder (the average particle size is 1 to 10 μm, with a purity of more than 99%)

Table 1 shows the formulation and physical property data of each example and comparative example listed therein.

TABLE 1

|   | Example 1 | Example 2 | Example 3 | Example 4 | Example 5 | Comparative example 1 | Comparative example 2 |
|---|---|---|---|---|---|---|---|
| A-1 | 50 | 64 | 72 | 80 | 52 | 64 | — |
| A-2 | — | — | — | — | — | — | 64 |
| B-1 | 20 | 16 | 12 | 8 | 30 | — | 16 |
| B-2 | — | — | — | — | — | 16 | — |
| C-1 | 15 | 10 | 8 | 6 | 20 | — | 10 |
| C-2 | — | — | — | — | — | 10 | — |
| D | 15 | 10 | 8 | 6 | 50 | 10 | 10 |
| E | q.s. | q.s. | q.s. | q.s. | — | q.s. | q.s. |
| F | 40 | 40 | 40 | 40 | — | 40 | 40 |
| Glass transition temperature (DSC) ° C. | 164 | 169 | 175 | 177 | 171 | 168 | 172 |
| Dielectric constant (1 GHz) | 3.58 | 3.56 | 3.53 | 3.53 | 3.51 | 3.81 | 3.84 |
| Dielectric dissipation (1 GHz) | 0.0078 | 0.0075 | 0.0071 | 0.0071 | 0.0062 | 0.0108 | 0.0095 |
| Peel strength (N/mm) | 1.47 | 1.45 | 1.45 | 1.45 | 1.56 | 1.41 | 1.39 |
| Water absorption (%) | 0.07 | 0.07 | 0.06 | 0.06 | 0.07 | 0.07 | 0.07 |
| Solder dipping 288° C., s | >120 | >120 | >120 | >120 | >120 | >120 | >120 |
| Flame retardancy | V-0 | V-0 | V-0 | V-0 | V-0 | V-0 | V-0 |

Table 2 shows the formulation and physical property data of each comparative example listed therein.

TABLE 2

|  | Comparative example 3 | Comparative example 4 | Comparative example 5 | Comparative example 6 | Comparative example 7 | Comparative example 8 |
|---|---|---|---|---|---|---|
| A-1 | — | — | — | 64 | 64 | 35 |
| A-2 | — | 64 | 64 | — | — | — |
| B-1 | 50 | 16 | — | 16 | — | 25 |
| B-2 | — | — | 16 | — | 16 | — |
| C-1 | 30 | — | 10 | — | 10 | 20 |
| C-2 | — | 10 | — | 10 | — | — |
| D | 20 | 10 | 10 | 10 | 10 | 20 |
| E | q.s. | q.s. | q.s. | q.s. | q.s. | q.s. |
| F | 40 | 40 | 40 | 40 | 40 | 40 |
| Glass transition temperature (DSC) ° C. | 165 | 171 | 170 | 176 | 178 | 153 |
| Dielectric constant (1 GHz) | 3.77 | 3.79 | 3.77 | 3.75 | 3.78 | 3.70 |
| Dielectric dissipation (1 GHz) | 0.0105 | 0.0112 | 0.0121 | 0.0128 | 0.0116 | 0.009 |
| Peel strength (N/mm) | 1.25 | 1.45 | 1.43 | 1.42 | 1.48 | 1.41 |
| Water absorption (%) | 0.11 | 0.08 | 0.07 | 0.06 | 0.08 | 0.09 |
| Solder dipping 288° C., s | 65 | >120 | >120 | >120 | >120 | >120 |
| Flame retardancy | V-0 | V-0 | V-0 | V-0 | V-0 | V-0 |

The test methods of the characters above are as follows:

(a) Glass transition temperature (Tg): measured according to the differential scanning calorimetry (DSC) as the method stipulated under IPC-TM-650 2.4.25.

(b) Dielectric constant, the dielectric dissipation factor: the dielectric constant, the dielectric dissipation factor at 1 GHZ measured according to the resonance method using a strip line, in accordance with the method stipulated under IPC-TM-650 2.5.5.5.

(c) Peel strength: the peeling strength of the metal covering layer is measured according to the experiment conditions "after thermal stress" in the method of IPC-TM-650 2.4.8.

(d) Water absorption: measured according to the method of IPC-TM-650 2.6.2.1.

(e) Solder dipping resistance: time for delamination and blister is observed according to IPC-TM-650 2.4.13.1.

(f) Flame retardancy: measured according to UL94 vertical firing method

It can be known from the physical property data in table 1, in the comparative example 3 when using the dicyclopentadiene-type epoxy resin to be cured with the dicyclopentadiene-type novolac hardener, the dielectric constant is ordinary, the water absorption is high and the thermal resistance is pure; on the basis of dicyclopentadiene-type epoxy resin and dicyclopentadiene-type novolac the comparative example 2 introduces bisphenol-A benzoxazine resin, therefore the Tg and the thermal resistance have an increase, the water absorption has a decrease, while the dielectric performances has no obvious improvements. In the comparative examples 1, 4 and 5 when dicyclopentadiene-type benzoxazine resin, dicyclopentadiene-type epoxy resin and dicyclopentadiene-type novolac are respectively used alone, the dielectric constant and dielectric dissipation of the copper-clad laminate prepared are high. The dielectric constant of the copper-clad laminate prepared is about 3.8 and the dielectric dissipation of the copper-clad laminate prepared is about 0.0100 at a test frequency of 1 GHz. In the comparative example 6, the dicyclopentadiene-type benzoxazine resin and the dicyclopentadiene-type epoxy resin are employed to compound with the linear novolac. In the comparative example 7, the dicyclopentadiene-type benzoxazine resin and the isocyanate-modified epoxy resin are employed to compound with dicyclopentadiene-type novolac. The dielectric performances of both copper-clad laminates prepared therefrom are ordinary. In the comparative example 8, a small amount of dicyclopentadiene-type benzoxazine resin is used to be co-cured with dicyclopentadiene-type epoxy resin and dicyclopentadiene-type novolac. The dielectric performances of the boards are good but the Tg is low and the water absorption is relatively high; the examples 1-5 take the dicyclopentadiene-type benzoxazine resin as the main resin. After co-curing with dicyclopentadiene-type epoxy resin and dicyclopentadiene-type novolac, the dielectric performances, the Tg, the water absorption, the thermal resistance and the adhesive force of the laminates obtained therefrom are excellent.

As described above, compared to conventional halogen-free laminates, the laminate for printed circuits of the present invention has more excellent dielectric performances, moisture resistance, thermal resistance, and a higher adhesive power, suitable for use in the field of high density interconnect. Additionally, the present invention sufficiently exerts the synergistic character of the benzoxazine resin and phosphorus-containing flame retardant. The halogen content can reach V-0 standard in the flame retardant test UL94 within the scope of JPCA halogen-free standard requirements, having the efficacy of environmental protection.

The applicants state that the present invention illustrates the detailed composition of the present invention through the examples above, but is not limited to the detailed composition above, i.e., it does not mean the present invention must be embodied dependently on the detailed composition above. Those skilled belonging to the technical field should understand, any improvement to the present invention, equivalent replacement for each material of the product of the present invention, addition of auxiliary components and selection of specific products all fall into the protection scope and disclosure scope of the present invention.

The invention claimed is:

1. A halogen-free resin composition, comprising:

100 parts by weight of an organic solids component and a positive amount of up to 50 parts by weight of at least one filler (F), said organic solids component comprising (A), (B), (C), and (D):

(A) 52-80 parts by weight, based on 100 total parts by weight of the organic solids component, of a dicyclopentadiene-type benzoxazine resin having a chemical structure as follows:

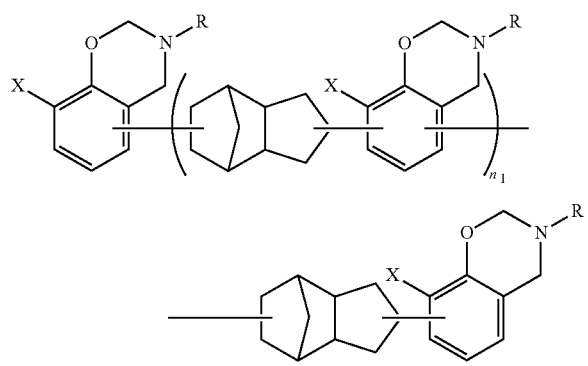

in which,

X is selected from —H, —CH$_3$, —C$_2$H$_5$, and —C(CH$_3$)$_3$, $n_1$ is 0 or 1, and R is an alkyl or an aryl;

(B) a dicyclopentadiene-type epoxy resin having a chemical structure as follows:

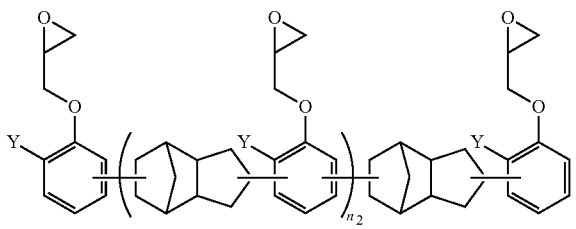

in which,

Y is selected from —H, —CH$_3$, —C$_2$H$_5$, and —C(CH$_3$)$_3$, and $n_2$ is any integer in 0-7;

(C) a dicyclopentadiene-type novolac hardener having a chemical structure as follows:

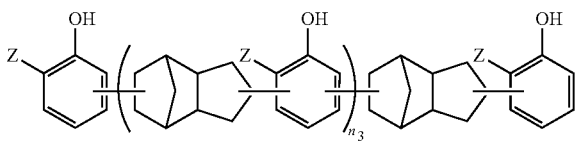

in which,

Z is selected from —H, —CH$_3$, —C$_2$H$_5$, and —C(CH$_3$)$_3$, and $n_3$ is any integer in 0-7; and (D) 5-50 parts by weight, based on 100 total parts by weight of (A), (B), and (C), of at least one phosphorus-containing flame retardant;

wherein the at least one filler (F) is other than the at least one phosphorus-containing flame retardant (D).

2. The halogen-free resin composition according to claim 1, wherein the dicyclopentadiene-type epoxy resin (B) is present in an amount of 5-30 parts by weight, based on 100 total parts by weight of the organic solids component.

3. The halogen-free resin composition according to claim 1, wherein the dicyclopentadiene-type novolac hardener (C) is present in an amount of 5-20 parts by weight, based on 100 total parts by weight of the organic solids component.

4. The halogen-free resin composition according to claim 1, wherein the at least one phosphorus-containing flame retardant (D) is selected from at least one of tri(2,6-dimethylphenyl)phosphine, 10-(2,5-dihydroxyphenyl)-9,10-dihydro-9-oxa-10-phosphaphenanthrene-10-oxide, 2,6-bis(2,6-dimethylphenyl)phosphino benzene, 10-phenyl-9,10-dihydro-9-oxa-10-phosphaphenanthrene-10-oxide, phenoxyphosphazene compound, phosphate, polyphosphate, phosphonate, and polyphosphonate.

5. The halogen-free resin composition according to claim 1, wherein the halogen-free resin composition further comprises at least one curing accelerator (E).

6. The halogen-free resin composition according to claim 5, wherein the at least one curing accelerator (E) is at least one of an imidazole hardener and a pyridine hardener.

7. The halogen-free resin composition according to claim 5, wherein the at least one curing accelerator (E) is at least one of 2-methylimidazole, 2-ethyl-4-methylimidazole, 2-phenylimidazole, 2-undecylimidazole, triethylamine, benzyl dimethyl amine and dimethyl amino pyridine.

8. The halogen-free resin composition according to claim 5, wherein the at least one curing accelerator (E) is present in an amount of 0.05-1% based on the combined weight of (A), (B), (C), and (D).

9. The halogen-free resin composition according to claim 1, wherein the at least one filler (F) is at least one of an inorganic filler and an organic filler.

10. The halogen-free resin composition according to claim 9, wherein the at least one inorganic filler is at least one of fused silica, crystalline silica, spherical silica, hollow silica, aluminum hydroxide, aluminum oxide, talcum powder, aluminum nitride, boron nitride, silicon carbide, barium sulfate, barium titanate, strontium titanate, calcium carbonate, calcium silicate, mica and glass fiber powder.

11. The halogen-free resin composition according to claim 9, wherein the at least one organic filler is at least one of polytetrafluoroethylene powder, polyphenylene sulfide powder, and polyether sulfone powder.

12. The halogen-free resin composition according to claim 1, wherein the at least one filler (F) is silica having an average particle size of 1-15 μm.

13. A prepreg comprising a reinforcing material and the halogen-free resin composition according to claim 1 attached thereon after impregnation and drying.

14. A laminate for printed circuits comprising at least 1 laminated prepreg according to claim 13.

15. A halogen-free resin composition, comprising:
100 parts by weight of an organic solids component and a positive amount of up to 50 parts by weight of at least one filler (F), said organic solids component comprising (A), (B), (C), and (D):
(A) 52-80 parts by weight, based on 100 total parts by weight of the organic solids component, of a dicyclopentadiene-type benzoxazine resin having a chemical structure as follows:

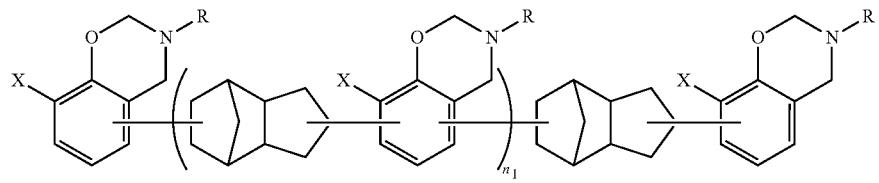

in which,
X is selected from —H, —CH$_3$, —C$_2$H$_5$, —C(CH$_3$)$_3$,
n$_1$ is 0 or 1, and
R is an alkyl or an aryl;
(B) a dicyclopentadiene-type epoxy resin;
(C) a dicyclopentadiene-type novolac hardener; and
(D) 5-50 parts by weight, based on 100 total parts by weight of (A), (B), and (C), of least one phosphorus-containing flame retardant;
wherein the at least one filler (F) is other than the at least one phosphorus-containing flame retardant (D).

* * * * *

UNITED STATES PATENT AND TRADEMARK OFFICE
CERTIFICATE OF CORRECTION

PATENT NO. : 9,487,652 B2  Page 1 of 1
APPLICATION NO. : 14/552775
DATED : November 8, 2016
INVENTOR(S) : Jiang You It is certified that error appears in the above-identified patent and that said Letters Patent is hereby corrected as shown below:

In the Specification

Column 1
Line 35, change "put forwards its own" to --put forward its own--

Column 1
Line 48, change "likely to crack" to --it is likely to crack--

Signed and Sealed this
Twenty-eighth Day of February, 2017

Michelle K. Lee
*Director of the United States Patent and Trademark Office*